US006584728B2

United States Patent
Aesch, Jr. et al.

(10) Patent No.: US 6,584,728 B2
(45) Date of Patent: Jul. 1, 2003

(54) TERMITE BAIT STATION AND METHOD OF SERVICE

(76) Inventors: Harold W. Aesch, Jr., 915 E. Fork Dr., Phoenix, AZ (US) 85048; Kenneth R. Chitwood, 130 Shomate Dr., Longwood, FL (US) 32750

(*) Notice: Subject to any disclaimer, the term of this patent is extended or adjusted under 35 U.S.C. 154(b) by 36 days.

(21) Appl. No.: 09/784,664

(22) Filed: Feb. 15, 2001

(65) Prior Publication Data

US 2002/0116866 A1 Aug. 29, 2002

(51) Int. Cl.[7] .................................................. A01M 1/20
(52) U.S. Cl. .......................... 43/132.1; 43/124; 43/131
(58) Field of Search ....................... 43/124, 131, 132.1, 43/107, 111; 52/101

(56) References Cited

U.S. PATENT DOCUMENTS

| | | | |
|---|---|---|---|
| 3,909,975 A | * 10/1975 | Basile | 43/124 |
| 4,625,474 A | * 12/1986 | Peacock, deceased et al. | 52/101 |
| 5,184,419 A | * 2/1993 | Tallon | 43/132.1 |
| 5,592,774 A | * 1/1997 | Galyon | 43/124 |
| 5,937,571 A | 8/1999 | Megargle et al. | |
| 6,079,150 A | 6/2000 | Setkas et al. | |
| 6,079,151 A | * 6/2000 | Bishoff et al. | 43/132.1 |
| 6,149,928 A | * 11/2000 | French | 424/405 |
| 6,219,961 B1 | * 4/2001 | Ballard et al. | 43/131 |
| 6,233,865 B1 | * 5/2001 | Curtis et al. | 43/131 |
| 6,298,597 B1 | * 10/2001 | Koehler et al. | 43/131 |
| 6,397,516 B1 | * 6/2002 | Su | 43/124 |
| 6,401,384 B1 | * 6/2002 | Contadini et al. | 43/132.1 |

FOREIGN PATENT DOCUMENTS

| | | | |
|---|---|---|---|
| DE | 3627995 A1 | * 3/1988 | 43/131 |
| EP | 0442190 A1 | * 8/1991 | 43/131 |

* cited by examiner

Primary Examiner—Peter M. Poon
Assistant Examiner—David J Parsley
(74) Attorney, Agent, or Firm—John D. Lister

(57) ABSTRACT

A termite colony is treated with a termiticide by locating a bait station on or beneath ground surface, adjacent a building, to attract termites in the region. The bait station container holds nontoxic cellulose bait. An opening in the bottom permits termites' ingress and egress to feed on the bait within the container. An opening in the top permits termite activity within the container to be monitored without disturbing the bait within the container and permits a termiticide to be introduced directly into the soil and termite tunnel tubes beneath the container by passing a termiticide injection tube through the openings in the container and into the soil beneath the container. Preferably, the termiticide is a non-repellent termiticide, which is lethal to termites through ingestion, contact and/or transferal.

9 Claims, 1 Drawing Sheet

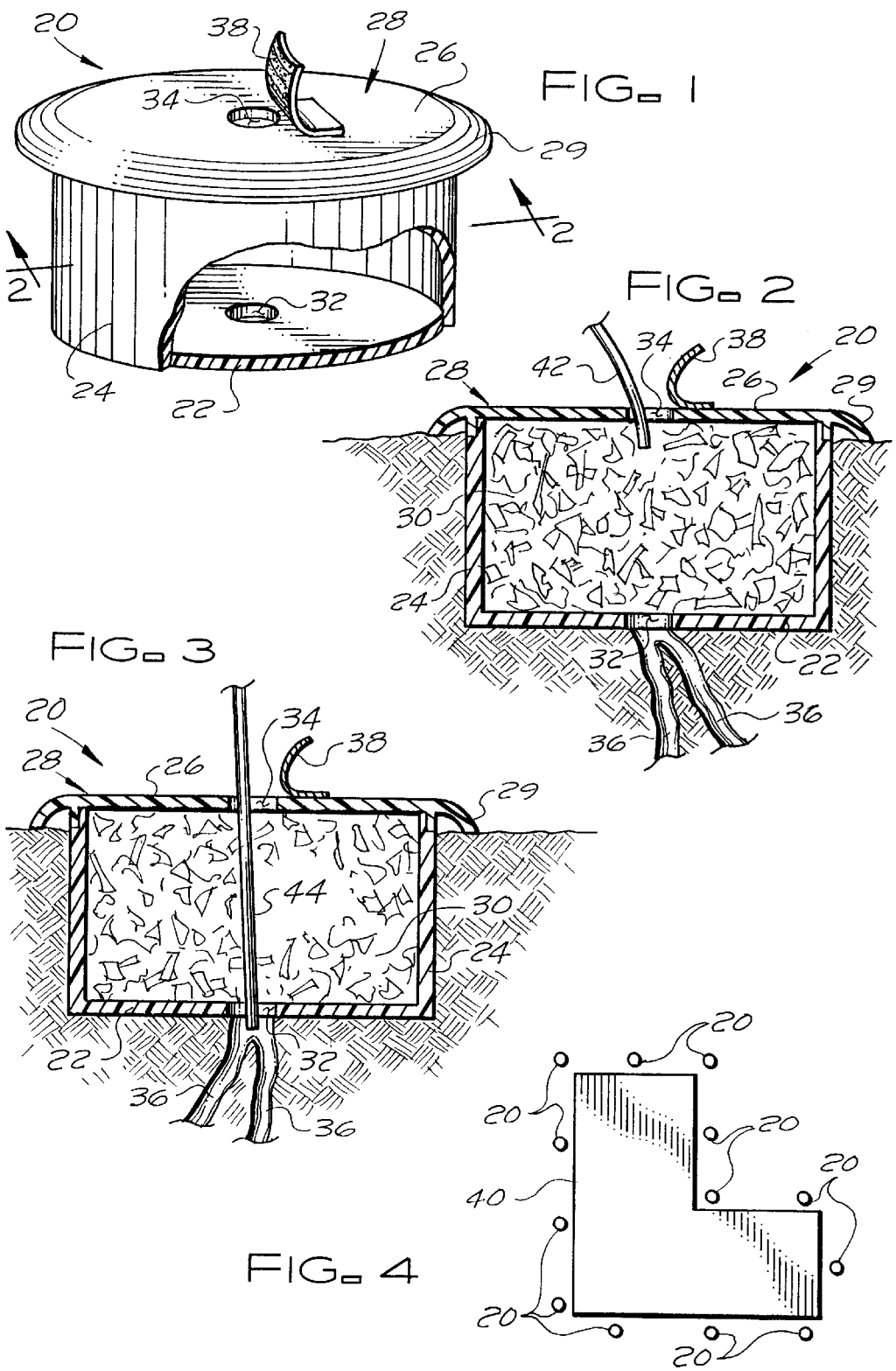

TERMITE BAIT STATION AND METHOD OF SERVICE

BACKGROUND OF THE INVENTION

The present invention relates generally to the treatment of termite colonies with a termiticide, and, in particular, to a subterranean termite bait station for attracting termites and a method utilizing the subterranean termite bait station in the treatment of a termite colony with a termiticide that is non-repellent to termites and, preferably, lethal to termites through ingestion, contact and/or transferal.

Termites do more property damage in the United States than hurricanes, earthquakes and vandalism combined. In order to control termites with a toxicant (hereinafter "termiticide"), termites must come in contact with the termiticide. Termites ingress and egress a food source through underground and above ground tunnel tubes which extend between a colony nest and the food source, e.g. a building. These tunnel tubes are climate controlled and impervious to termiticides sprayed on the soil and, for as long as the termites remain sealed within their tunnel tubes, the termites are protected from contact with the termiticides sprayed on the soil.

For decades, one method for controlling termites has included the saturation of the soil in a zone under and surrounding a building. To get the termiticide within the termite tunnel tubes, a trench is dug around the building. This breaks the walls of the termite tunnel tubes passing through the zone. The soil from the trench is saturated with termiticide and the trench is filled with this termiticide treated soil. As the termites repair their fractured tunnel tubes, the termites come into contact with the termiticide treated soil and the termiticide is thereby introduced into the colony.

Other methods for controlling termites involve breaking into visible, above ground termite tunnel tubes and injecting a termiticide into the tunnel tubes with a syringe or breaking into visible, above ground termite tunnel tubes and placing a device containing termiticide in the pathways of the termite tunnel tubes. A major problem encountered, when using these methods of termite control, is locating the termite tunnel tubes, which for the most part are hidden behind stucco facings, in wall voids, etc.

In addition to the above methods, there are numerous methods in commercial use for treating termite colonies with termiticides which use termite bait stations, but typically, these methods for treating termite colonies with termiticides use bait stations, such as the termite bait station of U.S. Pat. No. 5,937,571, issued Aug. 17, 1999, which incorporate toxic baits within the termite bait stations, such as slow acting toxicants and/or growth inhibitors. In another method for treating termite colonies with termiticides, the termites are enticed to form a pheromone trail to a bait station to feed on nontoxic sticks of cellulose, such as wood or cardboard. After the members of the termite colony are feeding at the bait station, the pest control technician removes the nontoxic bait and replaces the nontoxic bait with a toxic bait or leaves the nontoxic bait in place and places a toxic bait adjacent the nontoxic bait. U.S. Pat. No. 6,079,150, issued Jun. 27, 2000, discloses such a method of treating termite colonies with termiticides.

When termites ingest termiticides and die shortly after feeding at a bait station, other termites in the colony associate the death of their companions with the new food source (the bait in the bait station) and cease to feed at the bait station. In an attempt to minimize this problem, a slow acting termiticide may be used or toxic baits may be substituted or placed adjacent nontoxic baits after the termites have been feeding at the bait station for a period of time. However, slow acting toxicants can prolong the treatment period required to control the population of a termite colony and any disturbance of the bait in the bait station, through the replacement of the nontoxic bait with a toxic bait or the introduction of a separate toxic bait adjacent the nontoxic bait, may cause the termites to stop feeding at the bait station. Even with the use of slow acting toxicants, most bait stations must be opened and the bait disturbed or removed to determine if there is any termite activity within the bait station.

Thus, there has been a need to provide a method for treating termite colonies which does not use a toxic bait in the bait station container; permits the detection of termite activity within the bait station container with little or no disturbance of the bait; permits the treatment of the termites feeding at the bait station with a termiticide without contaminating the bait within the bait station with the termiticide; and, preferably, utilizes a termiticide which is non-repellent to termites and lethal to termites through ingestion, contact and/or transferal.

SUMMARY OF THE INVENTION

The method and the bait station of the present invention accomplish all of the goals listed immediately above. Since most termite tunnel tubes enter a building or structure (hereinafter "building") through cracks in the foundation, expansion joints, and/or control cracks in the floor slab of the building, all of which are generally relatively inaccessible, the method of the present invention utilizes a bait station containing a nontoxic bait to lure the termites to an accessible location outside of the building where termiticide can be introduced into the termites tunnel tubes leading from the colony to the bait station.

The bait station of the present invention is a container for holding nontoxic bait which is adapted to be located on or beneath ground surface adjacent a building to attract termites to the bait station. The container has one or more openings in its bottom wall through which termites may have subterranean ingress and egress to and from the interior of the container to feed on the nontoxic bait e.g. a cellulose bait such as wood or paperboard, within the container. The container also has one or more openings in an upper wall of the container which, preferably, are each centered over an opening in the bottom wall of the container, for monitoring termite activity within the container and for passing a termiticide injection tube or syringe down through both the container and the opening in the bottom wall of the container to introduce a termiticide directly into the soil beneath the container and the one or more termite tunnel tubes leading into the container through the opening(s) in the bottom wall of the container with little or no disturbance of the termites feeding within the container and without introducing the termiticide into the container where the termiticide would contaminate the nontoxic bait. Preferably, the opening(s) in the upper wall of the container are each provided with a flap for sealing, opening and resealing the opening(s) in the upper wall of the container to permit the upper wall of the bait station to be closed except when termite activity within the station is being monitored or termiticide is being introduced into the termite tunnel tube(s) leading into the bait station. Preferably, the bait station includes a metal component, such as but not limited to a foil closure flap for the openings in the upper wall of the container or a foil label, so that, when the bait station is buried, the location of the termite station may be detected with a metal detector.

In the preferred embodiment of the method of the present invention, the termiticide utilized to treat the termite colony is a non-repellant termiticide that is lethal to termites through ingestion, contact and/or transferal. With this type of termiticide, it is not necessary for the termites to feed on toxic bait. By introducing the termiticide into the soil beneath the bait station container, the termiticide can be introduced directly into the tunnel tubes beneath the bait station through which the termites travel between the colony nest and the bait station thereby leaving the bait station free of toxicants and safe to use where children or pets might gain access to the bait station. When termites pass through a treated tunnel tube, through contact with the termiticide within the tunnel tube, at least a few molecules of the toxicant within the tunnel tube will adhere to each of the termites. These termites will then carry the toxicant back to the colony nest. Since termites are social insects, other termites will groom the contaminated termites and, in turn, be groomed by other termites to spread the contamination throughout the colony. In this way, the entire colony including the reproductive(s) of the termite colony and the workers feeding upon the building, are destroyed, thereby, eliminating the need to drill holes through the foundation or walls of the building to treat the termites.

BRIEF DESCRIPTION OF THE DRAWINGS

FIG. 1 is a schematic perspective view of a subterranean bait station container of the present invention without bait in the container and with a portion of the container broken away to better illustrate an opening in the bottom wall of the container.

FIG. 2 is a vertical cross section of the subterranean bait station container of FIG. 1, taken substantially along lines 2—2 of FIG. 1, showing the bait station container partially buried, nontoxic bait within the bait station container, and termite activity within the bait station being monitored with a probe.

FIG. 3 is a vertical cross section of the subterranean bait station container of FIG. 1, taken substantially along lines 2—2 of FIG. 1 showing the bait station container partially buried, nontoxic bait within the bait station container, and termiticide being directly introduced through a tube into the soil beneath the container and one or more termite tunnel tubes leading into the bait station.

FIG. 4 is a schematic plan view of a building with bait stations located adjacent the foundation of the building in accordance with the method of the present invention.

DESCRIPTION OF THE PREFERRED EMBODIMENTS

As shown in FIG. 1, the container 20 of the bait station of the present invention has a bottom wall 22, a sidewall 24 and an upper wall 26. While the bait station container 20 shown has a generally circular horizontal cross section, the bait station container may have a rectangular or other horizontal cross section. Preferably, the upper wall 26 of the bait station container is a lid 28 which can be removed to place nontoxic bait 30, preferably a cellulose bait such as wood or paperboard, within the container and replaced to seal the top of the container. As shown, the lid 28 has an annular peripheral flange 29 that may contact the ground surface about the periphery of the container 20. Typically, a bait station container 20 has a volume of about thirty cubic inches or more to contain a sufficient amount of nontoxic bait for a termite colony to feed on for a sufficient period of time to permit monitoring of the bait station and treatment of the termite tunnel tubes leading to the bait station with a termiticide, e.g. a bait station with a circular horizontal cross section typically would be about three to five inches in diameter by about three to five inches in height.

The bottom wall 22 of the container 20 includes one or more openings (only one opening 32 is shown) which are each large enough to permit termite ingress and egress to and from the interior of the container 20 so that the termites can feed on the nontoxic bait within the container and establish termite tunnel tubes between the colony nest and the bait station. Preferably, the opening 32 in the bottom of the container is small enough to prevent the excessive escape of methane gas from within the container and to prevent nontoxic bait from falling out of the container. While a termite can pass through an opening about $\frac{1}{32}$ of an inch in diameter, typically the opening or openings 32 in the bottom wall 22 of the container are about $\frac{1}{2}$ to about $\frac{7}{8}$ of an inch in diameter.

The upper wall 26 includes one or more openings (only one opening 34 is shown) that are large enough (typically about $\frac{5}{8}$ to about 718 of an inch in diameter) to permit the monitoring of termite activity within the container 20 with the probe of a methane gas detector or a fiber optic device, and the insertion of a hollow rod through the container 20 and the opening or openings 32 in the bottom wall of the container 20 to introduce termiticide into the soil beneath the container and the termite tunnel tubes 36 beneath and leading into the container through the opening(s) 32. Preferably, when termite activity is being monitored through the detection of methane gas, the opening or openings 34 in the upper wall of the container 20 are small enough to prevent the excessive escape of methane gas from within the container while performing the monitoring procedure. Preferably, the opening or openings 34 in the upper wall 26 of the container 20 are centered over the opening or openings 32 in the bottom wall 22 of the container to facilitate the insertion of a hollow termiticide injection or delivery tube, e.g. a syringe tube, through an opening 34 in the upper wall 26 of the container, through the interior of the container, through an opening 32 in the bottom wall 22 of the container, and into the soil beneath the container to dispense termiticide directly into the tunnel tubes 36 leading into the opening 32 without introducing the termiticide into the container where the termiticide would contaminate the nontoxic bait.

Preferably, the opening or openings 34 in the upper wall 26 of the container 20 are provided with a closure device or devices for sealing, opening and resealing the opening or openings 34 in the upper wall 26, such as but not limited to a closure flap or flaps 38. Preferably, the closure flap or flaps 38 are adhesively secured to the upper surface of the upper wall 26 by a pressure sensitive adhesive so that the closure flap or flaps 38 can be repeatedly peeled back from the opening or openings 34 to gain access to the interior of the container 20 and repeatedly resealed over the opening or openings 34 to close the opening or openings. While the closure flap or flaps 38 may be made of other flexible materials, preferably, the closure flap or flaps 38 are made of a metal foil, a metallized polymeric film, a metallized paper, a metal foil polymeric film laminate, or a metal foil paper laminate.

When the bait station container 20 is buried or when grass or weeds grow up about the container, the metal portion of the closure flap or flaps 38 may be used to detect the location of the bait station with a conventional metal detector. In addition to the metal in the closure flap or flaps 38 or in lieu of the metal in the closure flap or flaps 38, a label including a metal portion, e.g. a metallized polymeric film or a metal foil, or a metal component forming part of the container may also be used as an aid in locating the bait station with a metal detector.

In the method of the present invention, one or more bait station containers 20 are located adjacent the foundation 40 of a building, e.g. as schematically shown in FIG. 4. The bait station containers 20 are spaced from each other, e.g. at ten foot intervals, and, as needed, may be spaced about the entire periphery of the building foundation or a portion of the periphery of the building foundation. The bait station containers are filled with nontoxic bait, such as but not limited to a cellulose bait of wood or paperboard, and are buried, partially buried or placed on the ground surface at the selected locations. Where the bait station containers are only partially buried or placed on the ground surface, the bait station containers 20 should be anchored in place so that the containers cannot be easily moved and, once the termites commence feeding at the station, the termites will not be disturbed. The containers may be anchored in place by providing spikes (not shown) that project downward from the undersides of the bottom walls 22 and are integral with the bottom walls 22 of the containers. Whether the bait station containers 20 are buried, partially buried or placed on the ground surface, the open or openings 32 in the bottom wall of each container 20 are in contact with the ground so that the termites can gain subterranean ingress and egress to and from the containers 20.

The bait station containers 20 are left in place and periodically checked for termite activity. To check or monitor a bait station container for termite activity, the container 20 is first located either visually or, if the container is buried or hidden by grass or weeds, preferably, with a metal detector. Termites give off methane gas and the greater the number of termites feeding on the nontoxic bait within a container 20, the higher the concentration of methane gas within the container 20. Thus, one preferred method of checking the bait station containers 20 for termite activity is to measure the concentration of methane gas within each container 20 with a conventional, commercially available, methane gas detector, such as but not limited to a methane detector marketed by TIF Instruments, Inc. of Miami, Fla. Another preferred method of determining if there is termite activity within a bait station container 20 is to observe the activity visually within the container by means of a fiber optic device such as but not limited to a fiber optic scope marketed by Pestube Systems, Inc. of Chandler, Ariz. Once a bait station container 20 is located, and uncovered, if necessary, the closure flap 38 is peeled back from the opening or one of the openings 34 in the upper wall 26 of the container and a probe 42 of the methane detector or the fiber optic device is inserted into the container through the opening 34 to detect methane gas levels within or visually observe any termites within the container 20 without disturbing any termites that might be feeding in the container 20. While it is preferred to use a methane gas detector or a fiber optic device to determine if termites are active within a bait station container 20 and while it is believed that a mere visual inspection without the aid of a fiber optic device would be much less effective, it is also contemplated that a service technician may merely look into the container through one or more openings 34 in the upper wall of the container to determine if there is any termite activity within the container.

If termites are found to be actively feeding within a bait station container 20, the termiticide is administered. As schematically shown in FIG. 3, preferably, the termiticide is administered by inserting a hollow tube 44, preferably, similar to a long hypodermic needle, which leads from a source of termiticide, down through the opening 34 in the upper wall 26 of the container, through the interior of the container, through the opening 32 in the bottom wall 22 of the container, and into the soil and the portions of termite tunnel tubes 36, extending between the colony nest and the opening 32, beneath the container. When performing this step, the hollow tube 44 may break through the walls of the termite tunnel tubes and/or be inserted into the entrances or mouths of the termite tunnel tubes 36. Once the hollow tube 44 is thus positioned, the termiticide is injected directly into the soil (preferably saturating the soil beneath the container) and the termite tunnel tubes beneath the container, but not into the nontoxic bait within the container. An alternative method of injecting the termiticide into the termite tunnel tube(s) 36 beneath the container 20 involves passing the hollow tube 44 at an angle through the soil from the ground surface adjacent the container until the hollow tube penetrates one or more tunnel tubes beneath the container and injecting the termiticide into the soil and the tunnel tube(s) beneath the container. As the termites repair the tunnel tubes with the treated soil and continue to pass back and forth through the treated termite tunnel tube(s) 36 to feed on the nontoxic bait within the container 20, the termiticide in the soil and tunnels contacts and adheres to the termites which carry the termiticide back to colony.

In the preferred method of the present invention, the termiticide injected into the soil and the termite tunnel tube(s) 36 beneath the containers 20 is non-repellent to termites and lethal to termites through ingestion, contact and/or transferal. An example of a preferred termiticide, which is non-repellent to termites and lethal to termites through ingestion, contact and/or transferal, is a termiticide containing fipronil as its active ingredient. Aventis Environmental Science USA of Montvale, N.J. sells such a termiticide under the trade designation "TERMIDOR" termiticide. Since the termites do not smell, see or feel this termiticide, the termites continue to pass freely through the treated area of the tunnel tube(s) picking up the termiticide and carrying the termiticide back to the colony nest. In the colony nest, other termites that contact the contaminated termites through feeding or grooming or through cannibalizing the termites killed by the termiticide become carriers of the termiticide thereby spreading the termiticide throughout the colony.

While not a preferred method of utilizing the bait station container 20 of the present invention to treat a termite colony with termiticide, after termite activity is detected within the bait station container, it is contemplated that the termiticide, e.g. a termiticide containing fipronil, may be introduced into the container 20 to saturate or otherwise contaminate the previously nontoxic bait 30 within the container with the termiticide. The termites feeding in the container 20 will thus come into contact with the termiticide on the bait, ingest the termiticide by feeding on the bait, and/or have the termiticide transferred to themselves through contact with other termites. Soil beneath the container 20 may also be saturated with the termiticide, e.g. through the flow of termiticide down through the opening(s) 32 in the bottom wall of the container and/or by passing the hollow tube 44 down through the opening(s) 32 in the bottom wall of the container and ejecting the termiticide from the tube into the soil and termite tunnel tubes.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of treating a termite colony with a termiticide, comprising:

locating a bait station on or beneath ground surface adjacent a building to attract termites in the region; the bait station being a container for holding a nontoxic cellulose bait material; the container having a top end and a bottom end; the container having a sidewall extending from the top end to the bottom end of the container; the container having a subterranean opening in the bottom end of the container through which termites may gain subterranean ingress and egress to and from an interior of the container to feed on nontoxic cellulose bait material housed within the container; the container having an opening in the top end of the container with closure means for sealing, opening and resealing the opening in the top end of the container to permit a monitoring of termite activity within the container and through which a termiticide injection tube may be inserted to pass through the container and through the subterranean opening of the container to introduce a termiticide into soil beneath the container without introducing the termiticide into the container where the termiticide would contaminate nontoxic bait within the container;

placing a nontoxic cellulose bait material within the container;

unsealing, opening and resealing the opening in the top end of the container with the closure means to gain access to the interior of the container through the opening in the top end of the container when the closure means is unsealed;

monitoring the interior of the container for termite activity through the opening in the top end of the container while the closure means is unsealed; and after detecting termite activity within the container, introducing a termiticide into the soil beneath the container without introducing the termiticide into the container.

2. The method of treating a termite colony with a termiticide according to claim 1, wherein:

the termiticide is non-repellent to termites and is lethal to termites through ingestion, contact and/or transferal.

3. The method of treating a termite colony with a termiticide according to claim 1, wherein:

the termiticide is introduced into the soil beneath the container by passing a termiticide injection tube through the opening in the upper end of the container, through the interior of the container, through the subterranean opening of the container, and into the soil beneath the container.

4. The method of treating a termite colony with a termiticide according to claim 3, wherein:

the termiticide is non-repellant to termites and is lethal to termites through ingestion, contact and/or transferal.

5. The method of treating a termite colony with a termiticide according to claim 1, wherein:

the activity of termites within the container is monitored by introducing a methane gas-measuring instrument into the container, which measures the concentration of methane gas within the container.

6. The method of treating a termite colony with a termiticide according to claim 1, wherein:

the activity of termites within the container is monitored visually by introducing a fiber optic device into the container through the opening in the upper wall of the container.

7. The method of treating a termite colony with a termiticide according to claim 1, wherein:

the container includes metal, the container is located beneath ground surface; and the container is located with a metal detector.

8. A method of treating a termite colony with a termiticide, comprising:

locating a bait station on or beneath ground surface adjacent a building to attract termites in the region; the bait station being a container for holding a nontoxic cellulose bait material; the container having a top end and a bottom end; the container having a sidewall extending from the top end to the bottom end of the container; the container having a subterranean opening through which termites may gain subterranean ingress and egress to and from an interior of the container to feed on nontoxic cellulose bait material housed within the container; the container having an opening in the top end with closure means for sealing, opening and resealing the opening in the top end to permit a monitoring of termite activity within the container and through which a termiticide injection tube may be inserted into the container to introduce a termiticide into the container to contaminate previously nontoxic bait within the container with the termiticide;

placing a nontoxic cellulose bait material within the container;

unsealing, opening and resealing the opening in the top end of the container with the closure means to gain access to the interior of the container through the opening in the top end of the container when the closure means is unsealed;

monitoring the interior of the container for termite activity through the opening in the top end of the container while the closure means is unsealed; and after detecting termite activity within the container, introducing a termiticide via said tube into the container to contaminate the previously nontoxic bait within the container with the termiticide.

9. The method of treating a termite colony with a termiticide according to claim 8, wherein:

the termiticide is also introduced into soil beneath the container.

* * * * *